(12) United States Patent
Kokal et al.

(10) Patent No.: US 9,134,712 B2
(45) Date of Patent: Sep. 15, 2015

(54) METHOD AND CONTROL ARRANGEMENT FOR CONTROLLING A CONTROLLED SYSTEM WITH A REPEATING WORKING CYCLE

(75) Inventors: Helmut Kokal, St. Josef (AT); Josef Mayrhofer, Graz (AT); Dirk Denger, Graz (AT); Martin Schmidt, Langen (DE); Luigi del Re, Linz (AT)

(73) Assignee: AVL List GmbH, Graz (AT)

( * ) Notice: Subject to any disclaimer, the term of this patent is extended or adjusted under 35 U.S.C. 154(b) by 736 days.

(21) Appl. No.: 13/061,621

(22) PCT Filed: Aug. 26, 2009

(86) PCT No.: PCT/EP2009/061009
§ 371 (c)(1),
(2), (4) Date: May 25, 2011

(87) PCT Pub. No.: WO2010/023228
PCT Pub. Date: Mar. 4, 2010

(65) Prior Publication Data
US 2011/0238359 A1    Sep. 29, 2011

(30) Foreign Application Priority Data
Sep. 1, 2008    (AT) ................................ GM464/2008

(51) Int. Cl.
*G01M 17/04* (2006.01)
*G05B 13/04* (2006.01)

(52) U.S. Cl.
CPC .................................. *G05B 13/048* (2013.01)

(58) Field of Classification Search
CPC ...... G06F 19/00; G01M 13/028; G01M 17/04
USPC .......................................................... 702/113
See application file for complete search history.

(56) References Cited

U.S. PATENT DOCUMENTS 3,942,363 A * 3/1976 Swis et al. .................. 73/116.05
4,576,129 A * 3/1986 Wallenfang et al. .......... 123/357

(Continued)

FOREIGN PATENT DOCUMENTS

| DE | 10038570 | 12/2001 |
|---|---|---|
| EP | 0812682 | 12/1997 |
| EP | 1087106 | 3/2001 |

OTHER PUBLICATIONS

English Abstract of EP1087106.

(Continued)

*Primary Examiner* — Sujoy Kundu
*Assistant Examiner* — Alvaro Fortich
(74) *Attorney, Agent, or Firm* — Dykema Gossett PLLC

(57) ABSTRACT

When arrangements with a repeating working cycle such as, for example, in the case of engine test benches, are being controlled, resonances which have to be damped by the control system are often excited by the test specimen (for example an internal combustion engine) in the working range of the arrangement. The invention proposes for this purpose a control concept in which a modified actual value $r_{ist\_mod}$ is determined from a current actual value $r_{ist\_akt}$ of the control system and from a predicted imminent system-delay-free actual value on the basis of the actual value of a previous working cycle, and said modified actual value $r_{ist\_mod}$ is fed to the control system.

17 Claims, 3 Drawing Sheets

(56) References Cited

U.S. PATENT DOCUMENTS

Figure 1:
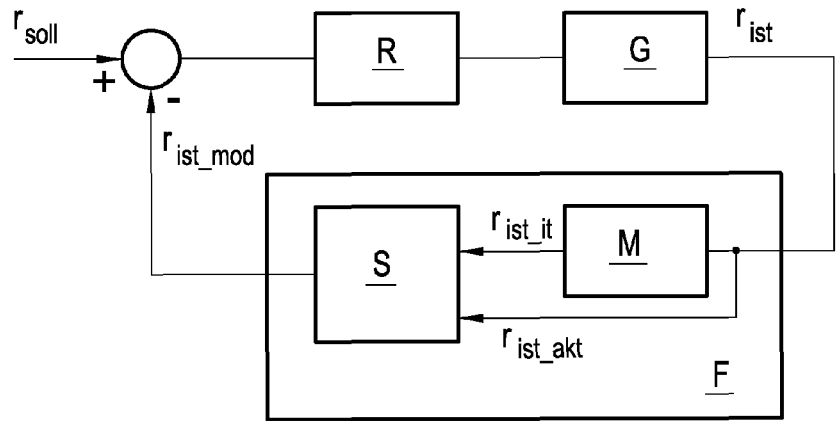

| | | | | |
|---|---|---|---|---|
| 4,870,585 | A * | 9/1989 | Manzolini | 701/101 |
| 5,006,994 | A * | 4/1991 | Andersson et al. | 701/123 |
| 5,268,842 | A * | 12/1993 | Marston et al. | 701/105 |
| 5,369,581 | A * | 11/1994 | Ohsuga et al. | 701/48 |
| 5,671,142 | A * | 9/1997 | Tatarazako | 701/37 |
| 5,705,742 | A * | 1/1998 | Fox et al. | 73/114.79 |
| 5,977,737 | A * | 11/1999 | Labriola, II | 318/599 |
| 6,032,656 | A * | 3/2000 | Itoyama et al. | 123/568.21 |
| 6,055,470 | A * | 4/2000 | Londot et al. | 701/33.4 |
| 6,154,702 | A * | 11/2000 | Fodor et al. | 701/71 |
| 6,220,232 | B1 * | 4/2001 | Torno et al. | 123/564 |
| 6,275,765 | B1 * | 8/2001 | Divljakovic et al. | 701/102 |
| 6,367,450 | B1 * | 4/2002 | Kato | 123/406.26 |
| 6,436,005 | B1 * | 8/2002 | Bellinger | 477/111 |
| 6,775,610 | B2 * | 8/2004 | Akiyama et al. | 701/114 |
| 6,986,292 | B2 * | 1/2006 | Kemnade | 73/862.191 |
| 6,994,074 | B2 * | 2/2006 | Doelker | 123/319 |
| 7,039,541 | B2 * | 5/2006 | Grunbacher et al. | 702/113 |
| 7,064,504 | B2 * | 6/2006 | Imai et al. | 318/400.04 |
| 7,096,746 | B2 * | 8/2006 | Kemnade | 73/862.191 |
| 7,275,426 | B2 * | 10/2007 | Lahti et al. | 73/114.32 |
| 7,334,561 | B2 * | 2/2008 | Neunteufl et al. | 123/295 |
| 7,440,839 | B2 * | 10/2008 | Cesario et al. | 701/106 |
| 7,578,288 | B2 * | 8/2009 | Thiel et al. | 123/690 |
| 7,677,222 | B2 * | 3/2010 | Ishikawa | 123/299 |
| 7,726,183 | B2 * | 6/2010 | Erlach et al. | 73/116.05 |
| 7,849,734 | B2 * | 12/2010 | Moritani et al. | 73/116.05 |
| 7,886,526 | B2 * | 2/2011 | Hatano et al. | 60/286 |
| 7,926,336 | B2 * | 4/2011 | Vickio et al. | 73/116.05 |
| 8,060,290 | B2 * | 11/2011 | Stewart et al. | 701/102 |
| 8,170,776 | B2 * | 5/2012 | Zhang | 701/110 |
| 8,186,204 | B2 * | 5/2012 | Ascher et al. | 73/114.49 |
| 8,332,129 | B2 * | 12/2012 | Yamada et al. | 701/109 |
| 8,401,763 | B2 * | 3/2013 | Kato et al. | 701/103 |
| 2005/0016295 | A1 * | 1/2005 | Kemnade | 73/862.28 |
| 2008/0190183 | A1 * | 8/2008 | Erlach et al. | 73/114.01 |
| 2010/0050759 | A1 * | 3/2010 | Vickio et al. | 73/116.06 |
| 2011/0010076 | A1 * | 1/2011 | Heinkele et al. | 701/103 |

OTHER PUBLICATIONS

English Abstract of EP0812682.
English Abstract of DE10038570.

* cited by examiner

METHOD AND CONTROL ARRANGEMENT FOR CONTROLLING A CONTROLLED SYSTEM WITH A REPEATING WORKING CYCLE

The present invention relates to a method and a control arrangement for controlling a test bench arrangement with a test specimen with repeating working cycle, and with a dynamometer which is connected to the test specimen by a connecting shaft.

On a test bench, e.g. an engine or drive train test bench, the test specimen, e.g. the internal combustion engine, vehicle drive, drive train, etc., is connected by a connecting shaft to a dynamometer (dyno), usually an electric motor, by means of which a desired load torque can be applied to the test specimen, wherein the dynamometer often can also be operated as driving machine. Conventional connecting shafts are usually selected such that the natural frequency of the test bench setup lies below the idle speed, e.g. at 17 Hz with respect to an idle frequency of approx. 20 Hz for a four-cylinder engine. In this manner, resonances in the working range of the test specimen are prevented; however, the dynamics of the load or drive torque is limited because the connecting shaft acts like a low-pass filter and the torque components above a limiting frequency, e.g. >approx. 15 Hz are attenuated. However, for certain test runs it would be important to be able to transmit torques with components of significantly higher frequency, e.g. 60 Hz. This means, however, that the connection can be excited into resonance in the working range of the engine because the system is operated in the critical range, e.g. in which the ignition frequency is equal to the natural frequency of the connection. At a natural frequency of 60 Hz, e.g. in the case of a four-cylinder engine, resonance would occur in the range of 1800 rpm. When using such a connecting shaft, thus, a control system is necessary which is able to dampen the occurring resonance. A conventional control system on the basis of actual measured values can partially reduce the problem, however, it is in general not suitable because such a solution can only react to the current actual value with a time delay. The time delay is a result of the inherent dead time and the low-pass character of measuring and control devices and is designated hereinafter as system delay. At higher frequencies, the system delay is not negligible anymore and causes that rapid changes of the set-point torque on the test bench can only be readjusted with a time delay.

An example of a suitable control which is able to dampen occurring resonances during the use of a connecting shaft which causes a higher natural frequency is described in "Development of Virtual and Real Simulator for Engine", K. Shirota, et al, SAE 2001 World Congress, SAE Technical Paper Series 2001-01-1355. The control is based in this case on a known control concept, namely an H-infinity controller.

It is therefore the object of the present invention to provide a control method and a control arrangement which is/are able to at least reduce the aforementioned resonance problems during the time-based control of arrangements with repeating working cycle, in particular of test bench arrangements which use a connection between test specimen and dyno with a natural frequency which lies in the range of the working range of the test specimen.

This object is solved for the method and the control arrangement according to the invention in that from a current actual value of the control system and a prediction of an imminent, system-delay-free actual value of a previous working cycle, a modified actual value is determined which is fed back to the control system. Thus, not only the current actual value is used for the control but also a prediction of the imminent, system delay-free actual values on the basis of previous working cycles, whereby the inherent system delay can be compensated. By compensating the system delay, the control is able to react without the present system delay to changes of the actual values, whereby an in-phase damping of resonances of higher frequencies is possible.

This can advantageously take place in such a manner that a current actual value of the control system is divided into a system-delayed, transient portion representing the change of the actual value of the present working cycle with respect to the previous working cycle and into a predictive portion in which the system delay is compensated and which represents a repeating portion, and from the system-delayed transient portion and the system delay-free predictive portion, a modified actual value is determined which is fed back to the control system. The predictive portion can advantageously be produced from a model which is based, for example, on an iterative model formation or is directly determined from a signal formed according to the principle of iterative control. Advantageously, the transient portion of the current actual values can be pre-processed with a working-cycle-synchronous average filter in order to eliminate the potentially still present iterative portion in the signal.

Particularly advantageous, the modified actual value is determined in that the actual values of a previous working cycle of the installation are stored in a time- or angle-resolved manner in a storage unit and the current actual values and the stored previous actual values are fed to a calculation unit, that the system delay inherent in the stored previous actual values is compensated by using other stored previous actual values, which are ahead of the present time by the system delay, as predictive actual values. In the calculating unit for determining the transient actual values, the difference between the stored, delay-afflicted previous actual values and the delay-afflicted current actual values is formed and the predictive actual values and the transient actual values are added to the modified actual value.

The compensation can be carried out in a particularly simple manner if the storage unit transmits the stored previous actual values and the stored actual values which are delayed with respect to angle or time by the system delay to the calculation unit.

For usual engine or drive train test benches without high-dynamic dyno, the natural frequency of the test bench arrangement, e.g. internal combustion engine-shaft-dyno, is often selected such that the natural frequency of the arrangement lies between the ignition frequency at idle speed and the ignition frequency at starter speed. Depending on the number of cylinders, this natural frequency is usually in the range of 15-30 Hz. The ignition frequency (=dominant excitation frequency) corresponds e.g. for four-stroke engine to the double rotation frequency. Due to incorrect ignition behavior of the engine, the ignition frequency (=dominant excitation frequency) can lie in the working range of the test specimen, however, in the range of the natural frequency. If, e.g. in the case of a four-cylinder four-stroke engine, only two cylinders run, the dominant excitation frequency lies at half the rotation frequency and thus can lie at a certain speed (which now can be above the idle speed) in the range of the natural frequency. This results in resonance effects (oscillations with the natural frequency) which in the worst case can result in the destruction of the installation. Here too, it is therefore necessary to damp said oscillation by suitable controller interventions. Due to the limited dynamics of the non-high-dynamic dyno of such a conventional test bench, without additional measures, the present method would result in violations of control variable limitations and operate the dyno in overload which would result in a shutdown. To prevent that another control method has to be implemented, such frequency portions are filtered out from the current actual value which lie above the 1.4-fold, preferably above the $\sqrt{2}$-fold of the natural frequency and the modified actual value is determined with said filtered current actual value. With this additional filtering, the present control method can also be used on conventional test benches. It is also possible to retrofit existing test benches with the control method according to the invention which then are suitable for high-dynamic tests as well as for tests with usual dynamics.

Figure 2:
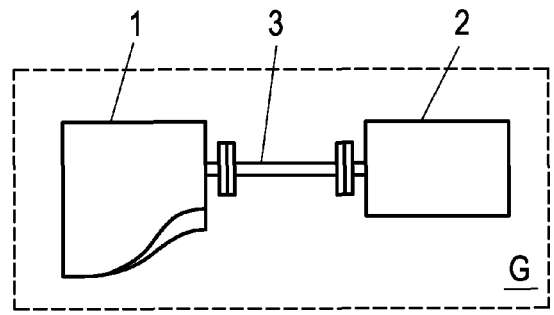
Figure 3:
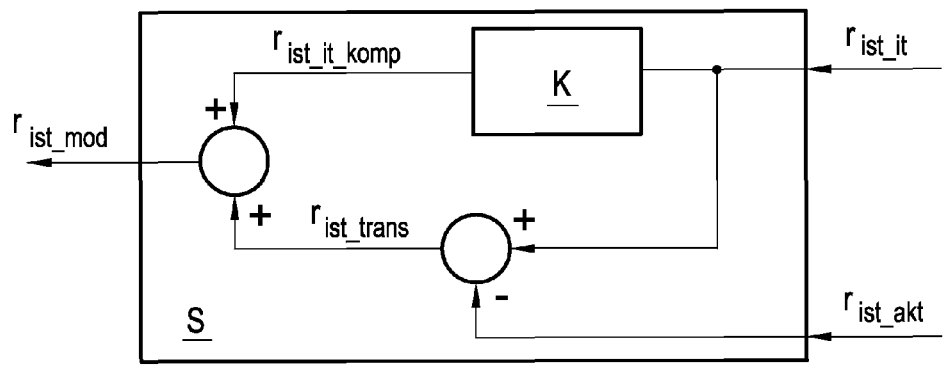
Figure 4:
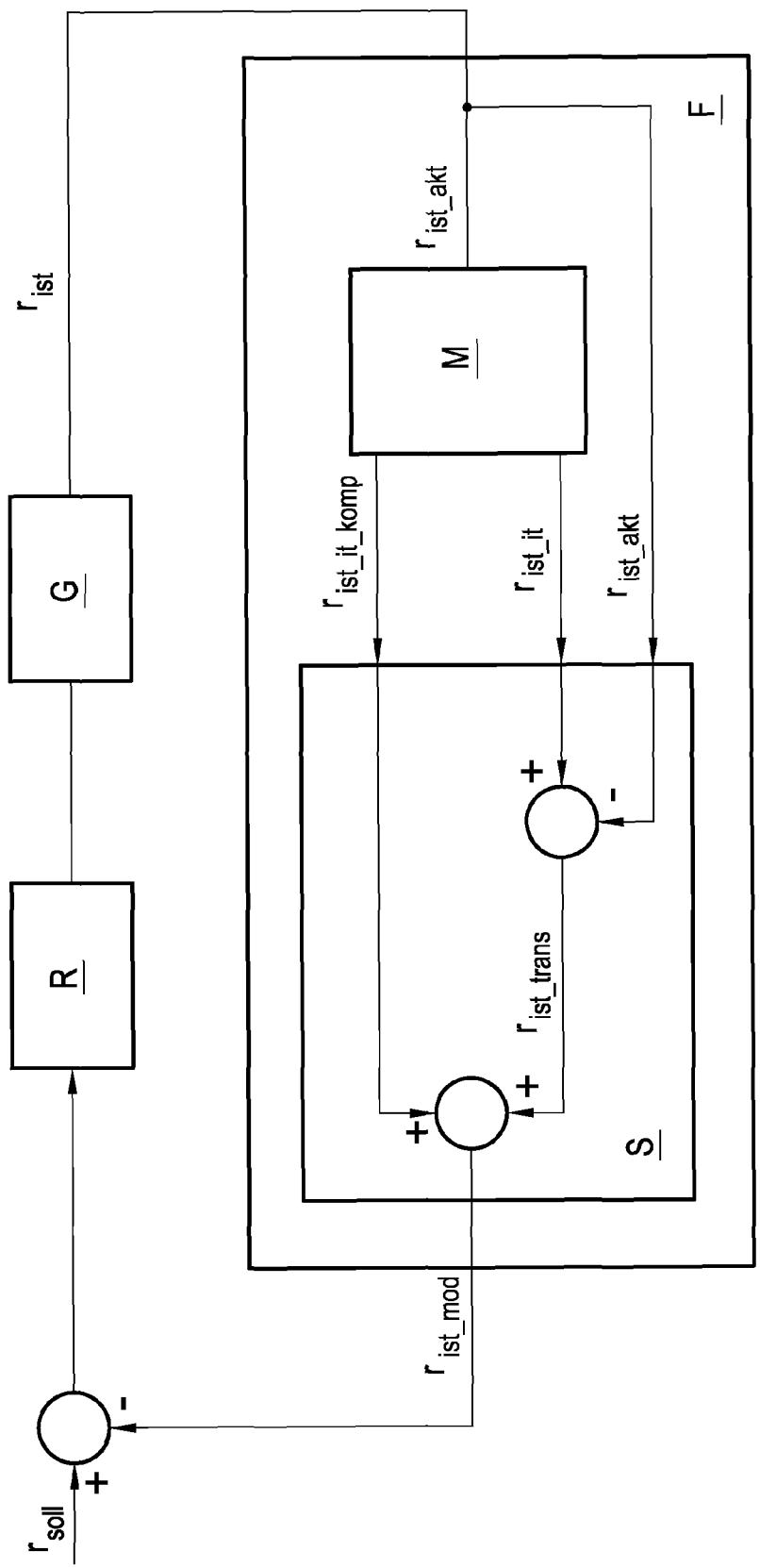
Figure 5:
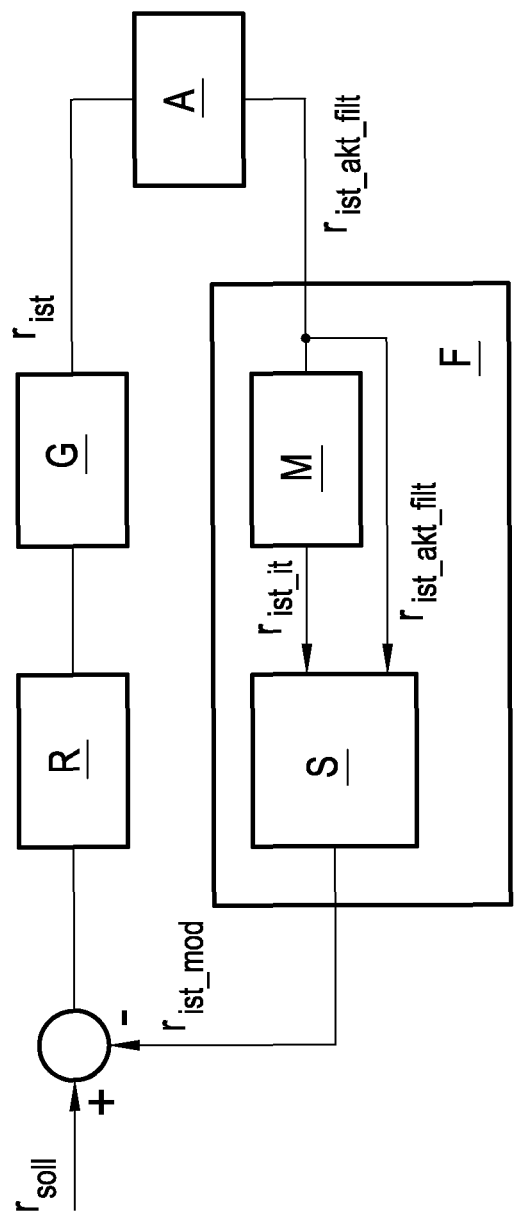

The present invention is described hereinafter by means of the FIGS. 1 to 5 which show schematic, exemplary, non-limiting and advantageous configurations. In the figures:

FIG. 1 shows a control diagram with an actual value calculation unit according to the invention in a feedback branch, FIG. 2 shows an example of a controlled system, FIG. 3 shows a schematic circuit diagram of a calculation unit for determining the modified actual value, FIG. 4 shows a further configuration of a control diagram, and FIG. 5 shows a further configuration of a control diagram according to the invention.

FIG. 1 shows a simple control diagram with a controlled system G to be controlled, here, a test bench arrangement with test specimen 1 (e.g. internal combustion engine, drive train, etc.) and dynamometer 2 (e.g. electric motor) which are interconnected with a connecting shaft 3 as illustrated in FIG. 2, and a controller R. The controlled system G is in a known manner a control model of the arrangement to be controlled, here, the test bench arrangement, and the controller R controls a certain control variable r of the controlled system G, here, e.g. a shaft torque or a speed. The control is provided with a set-point value $r_{soll}$, and an actual value $r_{ist}$ is determined (e.g. measured) which is fed back in a known manner in a feedback loop and subtracted from the set-point value $r_{soll}$.

However, the current actual values $r_{ist\_akt}$ are always available delayed by the measurement and processing. Moreover, the control and the responsiveness of the installation itself introduce a time delay. The processing-, control- and installation-specific delays or dead times are designated hereinafter as system delay. By knowing the controller R and the installation, the system delay can be determined in advance which is considered to be known. Due to the system delay, a reaction to changes of the actual values $r_{ist}$ is only possible with a time delay. To reduce this problem, now, future (predictive) system-delay-free actual values are determined which are fed to the control system. Since accurate predictions are of course not possible, approximate values of the future actual values are determined. To compensate or reduce the system delay, preferably, actual values or actual value portions are determined which lie in the future by an amount corresponding to the system delay.

In order to be able to damp possible occurring resonances in the controlled system G, an actual value calculation unit F is now provided in the feedback branch which, from the actual value $r_{ist}$, calculates a modified actual value $r_{ist\_mod}$ which is fed back to the control system as described in detail hereinafter.

A working cycle, e.g. a complete combustion cycle of all cylinders in an internal combustion engine (e.g. 720° crank angle in a four-stroke engine) occurs repeatedly. This fact is utilized according to the invention. For this purpose, a storage unit M is provided in the actual value calculation unit F in which storage unit the actual values $r_{ist}$ of at least one working cycle preceding the present working cycle are stored. Thus, one previous working cycle, preferably the immediately preceding working cycle is always stored in the storage unit M. The storage preferably takes place in an angle- or time-resolved manner in discrete steps, e.g. one value per degree crank angle or per millisecond. Preferably, the storage unit M is configured as cyclic storage, i.e. that the stored values are always shifted through in a resolution-triggered manner until they fall out of the storage.

The actual values of the previous working cycle $r_{ist\_it}$ are now time-synchronously (or angle-synchronously) fed to a calculation unit S, i.e. that at the actual time (or angle), the past value stored in each case at the same time (or angle) is fed into the calculation unit S. Likewise, the current actual values $r_{ist\_akt}$ are fed to the calculation unit S. The actual values $r_{ist}$ change from one working cycle to the next by one potentially present transient portion. If the load or speed does not change over one working cycle, the installation is in a quasi-stationary operation which recurs per working cycle, wherein this portion is designated as an iterative portion. In this case, the transient portion would be zero. The dynamics of the transient portion are lower than the dynamics of the iterative portion. The transient portion of the current actual values can also be pre-processed with a working cycle-synchronous average filter in order to eliminate the potentially still present iterative portion in the signal. This portion in the signal occurs if the high-dynamic portion cannot be repeated completely.

In a preferred method, the stored values $r_{ist\_it}$ of the previous working cycle are now used to determine predictive (future) actual values and to compensate the system delay. For this purpose, first, a transient portion in the form of the transient actual values $r_{ist\_trans}$ is calculated in the calculation unit S by time-synchronously (or angle-synchronously) subtracting the current actual values $r_{ist\_akt}$ from the stored previous actual values $r_{ist\_it}$, as illustrated in FIG. 3. However, this transient portion $r_{ist\_trans}$ still contains the system delay. Further predictive actual values are determined in the compensation unit K by compensating the system delay in the stored previous actual values $r_{ist\_it}$, e.g. in that the stored value associated with the present crank angle (or time) is not forwarded, but instead the value which is temporally ahead by the known system delay. Thus, the system may use the past stored values $r_{ist\_it}$ to predict future values $r_{ist\_it\_komp}$. The (predictive) actual values $r_{ist\_it\_komp}$ (without system delay) compensated in this manner and the transient actual values $r_{ist\_trans}$ (with system delay) are now added together which results in a modified actual value $r_{ist\_mod}$ which is finally fed back to the control system. Thus, the modified actual value $r_{ist\_mod}$ is a mixture of a predictive portion without system delay and a transient portion with system delay. The predictive portion which is now delay-free contains the information with the high dynamics which is necessary for an in-phase control. The dynamics of the transient portion is significantly lower than the one of the predictive portion for which reason the system delay is no problem here.

The compensation unit K can be eliminated in the calculation unit S if the storage unit M has two outputs, wherein at one output, the values associated to the actual angle (or time) are output and at the other output, the values delayed in time by the system delay are output, as illustrated in FIG. 4. Alternatively, it is also possible to provide two cyclic storage units, wherein in one storage unit always the entire working cycle is stored in a time- or angle-resolved manner, e.g. 720° crank angle in a four-stroke internal combustion engine, and in the other storage, the working cycle shortened by the system delay is stored, e.g. 690° crank angle in a four-stroke internal combustion engine and a system delay of 30°. Thus, at the second output, there is always a "future" value shortened by the system delay.

FIG. 5 shows a further configuration of the invention. Here, a low-pass filter A is connected between the controlled system G and the actual value calculation unit F which filter A filters such frequency portions out of the current actual values $r_{ist\_akt}$ which lie above the 1.4-fold, preferably above the $\sqrt{2}$-fold of the natural frequency of the arrangement. The modified actual value $r_{ist\_mod}$ is subsequently determined with said filtered, current actual value $r_{ist\_akt\_filt}$, as described above.

It is without importance for the present invention how the controller R is configured and how the controlled system G is modeled. Although the control diagram according to the invention with the actual value calculation unit F is primarily aimed at damping resonances, it should be noted, however, that the actual value calculation unit can of course also be used in control systems in which no resonances are to be expected—in this case as additional damping.

The invention claimed is:

1. A method for controlling a test bench arrangement comprising a test specimen with a repeating working cycle, and a dynamometer connected by a connecting shaft to the test specimen, the method comprising: obtaining a current actual value of a control variable of the test bench arrangement;
   obtaining a prediction of an imminent, system-delay-free actual value of the control variable;
   storing actual values of the control variable of a previous working cycle of the test-bench arrangement as stored, delay-afflicted, previous actual values of the control variable in a time- or angle-resolved manner in a storage unit;
   compensating for a system delay via determining a modified actual value of the control variable according to the current actual value and the prediction, wherein the prediction comprises a first value of the stored, delay-afflicted, actual values of the control variable and the first value corresponds to a time or angle of the previous working cycle that is ahead of a current time or angle by the system delay;
   providing the modified actual value of the control variable to a controller connected to the test bench arrangement; and
   reducing resonance problems in the test bench arrangement via the controller causing a change of at least one of a speed and a torque of the connection shaft according to the modified actual value of the control variable.

2. The method according to claim 1, comprising obtaining a system-delayed, transient portion representing a change of the current actual value of the control variable of a current working cycle with respect to the first value, wherein the prediction represents a repeating portion, and wherein the modified actual value of the control variable is also determined according to the system-delayed transient portion.

3. The method according to claim 2, wherein the system-delayed transient portion is pre-processed with a working cycle-synchronous average filter.

4. The method according to claim 2, comprising
   providing the current actual value of the control variable and the stored, delay-afflicted, previous actual values of the control variable to a calculation unit;
   wherein obtaining the transient portion includes calculating, by the calculation unit the difference between a second value of the stored, delay-afflicted previous actual values of the control variable and the current actual value of the control variable, the second value corresponding to a time or angle of the previous working cycle that is consistent with the current time or angle of the present working cycle; and
   wherein determining the modified actual value of the control variable includes adding the prediction and the transient portion.

5. The method according to claim 4, wherein the storage unit transmits the stored, delay-afflicted, previous actual values of the control variable to the calculation unit.

6. The method according to claim 1, wherein from the current actual value such frequency portions are filtered out which lie above the 1.4-fold, preferably above the $\sqrt{2}$-fold, of the natural frequency and the modified actual value is determined with this filtered current actual value.

7. A control system for controlling a test bench arrangement, the control system comprising:
   a test specimen with a repeating working cycle, the test specimen connected by a connecting shaft to a dynamometer;
   a controller; and
   an actual value calculation unit,
   wherein the actual value calculating unit is arranged in a feedback branch,
   wherein the actual value calculation unit is configured to
      process a current actual value of a control variable of the control system and a prediction of an imminent, system-delay-free actual value of the control variable to form a modified actual value of the control variable;
      access stored, delay-afflicted, previous actual values of the control variable of a previous working cycle of the test bench arrangement that are stored in a time- or angle-resolved manner in a storage unit; and, compensate for a system delay via the prediction, wherein the prediction comprises a first value of the stored, delay-afflicted, actual values of the control variable and the first value corresponds to a time or angle of the previous working cycle that is ahead of a current time or angle by a system delay;
   wherein the controller is configured to reduce resonance problems in the test bench arrangement via causing at least one of a speed and a torque of the connection shaft to change according to the modified actual value.

8. The control system according to claim 7, wherein current actual value of the control variable of the control system can be divided into a system-delayed transient portion representing a change of a current working cycle with respect to the previous working cycle and into the prediction in which the system delay is compensated, and wherein the actual value calculation unit is configured to determine the modified actual value from the system-delayed transient portion and the predictive portion, and feed the modified actual value back to the controller.

9. The control system according to claim 8,
   wherein the actual value calculation unit includes the storage unit,
   wherein the actual value calculation unit is configured to receive the current actual value of the control variable and the storage unit is configured to store actual values of the control variable of the previous working cycle of the control system in a time- or angle-resolved manner in the storage unit as the stored, delay-afflicted, previous actual values of the control variable, and
   wherein the actual value calculation unit is configured for determining the transient portion according to a difference between the stored, delay-afflicted, previous actual values stored in the storage unit and the current actual values of the control variable.

10. The control system according to claim 9, wherein the storage unit includes a first output corresponding to the prediction and a second output corresponding to the stored, delay-afflicted, previous actual values which are delayed with respect to time or angle by the system delay.

11. The control system according to claim 7, comprising a low-pass filter configured to provide a filtered current actual value of the control variable by filtering frequency portions out of the current actual value of the control variable which lie above the 1.4-fold, preferably above the $\sqrt{2}$-fold, of the natural frequency and wherein the actual value calculation unit is configured to determine the modified actual value of the control variable according to the filtered current actual value of the control variable.

12. The method of claim 1, wherein the test specimen comprises an internal combustion engine; the repeating working cycle comprises a complete combustion cycle of all cylinders of the internal combustion engine; and the current actual value of the control variable is obtained from a present working cycle that is different than the previous working cycle.

13. A feedback control system comprising:
a controlled system including a repeating working cycle, the controlled system including a shaft;
a system controller configured to control the controlled system according to a modified feedback value; and
a calculation unit configured to:
obtain a present time or angle of a present working cycle;
obtain a system delay of the feedback control system;
obtain a measured feedback value of the controlled system;
obtain a first feedback value of a previous working cycle of the controlled system, the first feedback value corresponding to the present time or angle;
obtain a second feedback value of the previous working cycle of the controlled system, the second feedback value corresponding to a future time ahead of the present time or angle by the system delay;
obtain a transient value according to a difference between the measured feedback value and the first feedback value; and
obtain a predictive value according to the second feedback value;
compensate for the system delay via:
obtaining the modified feedback value according to the transient value and the predictive value; and
providing a difference between a set point and the modified feedback value to the system controller; and
reduce resonance problems in the controlled system via changing at least one of a speed and a torque of the shaft according to the modified feedback value.

14. The system of claim 13, wherein the controlled system comprises an internal combustion engine; the present working cycle comprises a complete combustion cycle of all cylinders of the internal combustion engine; and the calculation unit is configured to obtain the measured feedback value from the present working cycle, the present working cycle being different from the previous working cycle.

15. The method of claim 1, wherein a connection between the test specimen and the dynamometer includes a natural frequency within a working range of the test specimen.

16. The method of claim 15, where said reducing resonance problems in the test bench arrangement includes in-phase damping of resonances in a high frequency range.

17. The method of claim 16, wherein the high frequency range includes frequencies of at least 60 Hz.

* * * * *

UNITED STATES PATENT AND TRADEMARK OFFICE
CERTIFICATE OF CORRECTION

| | | |
|---|---|---|
| PATENT NO. | : 9,134,712 B2 | Page 1 of 1 |
| APPLICATION NO. | : 13/061621 | |
| DATED | : September 15, 2015 | |
| INVENTOR(S) | : Helmut Kokal et al. | |

It is certified that error appears in the above-identified patent and that said Letters Patent is hereby corrected as shown below:

In the Claims:

Column 5, line 63, (claim 4), please insert --,-- after "unit".

Signed and Sealed this
Twenty-sixth Day of January, 2016

Michelle K. Lee
*Director of the United States Patent and Trademark Office*